UNITED STATES PATENT OFFICE.

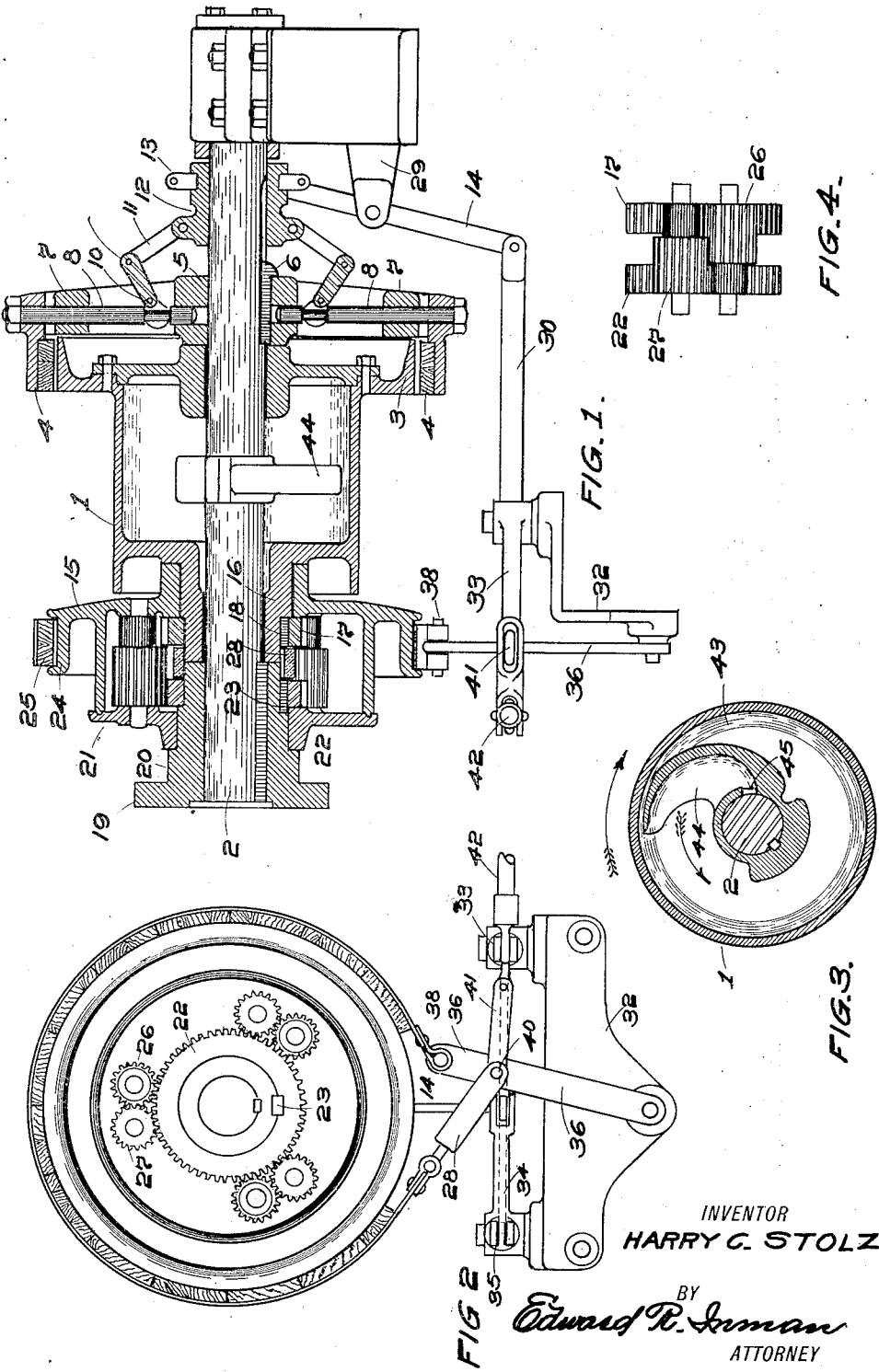

HARRY C. STOLZ, OF FRANKLIN, PENNSYLVANIA.

REVERSIBLE CLUTCH PULLEY.

1,407,899.   Specification of Letters Patent.   Patented Feb. 28, 1922.

Application filed September 23, 1920. Serial No. 412,204.

*To all whom it may concern:*

Be it known that I, HARRY C. STOLZ, a citizen of the United States, residing at Franklin, in the county of Venango and State of Pennsylvania, have invented certain new and useful Improvements in Reversible Clutch Pulleys, of which the following is a specification.

The object, construction and operation of my improved reversible clutch-pulley, are herein set forth with sufficient clearness to enable those skilled in the arts to which its construction and use respectively relate, to make and use the same.

*Object.*—The main object of this invention is, to provide a clutch pulley to be used upon any power-driven shaft which in itself is not readily reversible, such as line shafts, countershafts, and engine shafts, and more particularly the shaft of internal combustion motors, and, still more specifically, the shafts of gas and oil engines such as are commonly used for power purposes about oil wells. Another object of this invention is, to supply a reversible clutch-pulley with an efficient, automatic oiling device.

Applicant is aware that clutch-pulleys of this general type are, broadly, not new, but, so far as applicant is aware, if the reverse gearing is of the spur type it has, heretofore, been placed within the pulley, thus limiting the minimum diameter of the pulley so that it could not be made as small as conditions often require, thus necessitating resort to some other, and additional expedient, such as supplying a larger driven pulley in order to secure the required ratios between the clutch pulley and the pulley to be driven thereby. The construction of my improved clutch pulley is such that its minimum diameter need be only slightly larger than the shaft upon which it is mounted.

*Construction and operation.*—The construction of my improved reversible clutch-pulley is clearly shown in the accompanying drawings, the respective figures of which are as follows: Fig. 1 is a central, vertical, longitudinal section of the pulley, the actuating equipment being shown in side elevation.

Fig. 2 is an end elevation of the geared end of the pulley with the coupling and the cover-plate of the gear-housing removed to expose the reverse-gearing to view.

Fig. 3 is a transverse section of the pulley proper, the object of which is, to show the construction of the oiling device.

Fig. 4 is an elevation of the reverse gearing, showing one of the multiple pairs of pinions which form a part of said gearing.

The construction illustrated in said drawings is substantially as follows, the operation of the various elements being also set forth:—

The pulley proper consists of the member 1, which is revolubly mounted upon its shaft 2; one end thereof is formed into a clutch member 3, which is adapted to be engaged by the jaws 4, of the main or direct clutch, so as to be revolved thereby. Said direct clutch comprises in addition to said jaws, a spider consisting of a hub 5, which is keyed to shaft 2 by means of the key 6. Arms 7 are formed integrally with said hub 5 and carry said jaws 4 and the longitudinally-movable actuating bolts 8, to the outer end of which said jaws are respectively attached. Each of said bolts 8 is provided with an actuating device consisting of the lever 9 with its fulcrum at 10, and the inner end thereof in engagement with said bolt 8; to the free end of said lever is attached one end of a link 11, the other end of said link being connected to the collar 12, which is slidable longitudinally of shaft 2 by means of the yoke 13 and the lever 14. When this main or direct-acting clutch is set, the whole pulley organization turns in unison with shaft 2, which is the usual operation of the pulley.

At the end of the pulley opposite to the direct-acting clutch mechanism is mounted a reverse mechanism comprising the following elements: The gear-housing 15, which is revolubly mounted upon the extended hub 16 of said pulley 2; an annular gear member 17 is also mounted upon said hub 16, and is keyed thereto by means of the key 18.

Keyed to shaft 2 is a coupling member 19 by means of which the reverse pulley organization is connected to a driving shaft, or any other suitable power appliance; said coupling member 19 is provided with a hub 20, upon which the end member 21 of the gear housing 15 revolves freely. Another annular gear member, 22, in all respects identical with member 17, is keyed to said hub 20, by means of the key 23. Said gear housing is provided with a brake drum 24, around which passes a brake-band 25, that is adapted to engage said drum and thus to hold same and said gear housing rigidly, so that it cannot revolve.

Within said gear housing 15 are revolubly mounted a plurality of intermeshing pairs of pinions 26 and 27. One of each pair of pinions meshes with the gear 17, and the other with the gear 22, said gears being separated and spaced apart by means of an interposed spacing ring 28. Opposite said spacing ring, said pinions 26 and 27 intermesh. Now, inasmuch as the reverse gearing, comprising the gears 18, 23, and the pinions 26 and 27, is a well-known form of differential gearing, it will be readily understood that when the housing 15 is caused to remain stationary, a motion reversely to that of shaft 2 will be imparted to the pulley 1. The space within said gear-housing 15 which is not occupied by the gearing aforesaid is filled with a suitable lubricant. It will thus be seen that, in order to attain the proper functioning of this organization, it is necessary to provide means whereby the direct clutch will be disengaged, when the brake-band 25 is engaged, and, as a matter of course, between these two engagements, there is a neutral point at which neither the direct nor the reverse clutch mechanism is operative.

The actuating mechanism whereby the above actuation is attained, consists of the previously mentioned lever 14, having the fulcrum at 29: A horizontally-extending reach-rod 30 is connected at one end of the lower end of said lever 14; the other end of said rod 30 being connected to the arm 31 of a bell-crank which is carried by a bracket 32. Said bell-crank is actuated by means of an arm 33, which is also pivoted to said bracket 32. A connecting rod 34, shown in dotted lines in Fig. 2, connects said arm 33 with the other arm 35 of said bell-crank.

The lower end of a vertically-disposed lever 36, is provided with a fulcrum 37, in said bracket 32; the upper end of said lever 36 is connected to one end of the brake-band 25 at the point 38: The opposite, adjacent end of said band 25, is connected to the stirrup 39, which is attached to said lever 36 at the point 40, said point 40 being intermediate the point 38 and the fulcrum of said lever. Said lever 36 is connected to arm 33 by means of the links 41. Any suitable manipulating medium as 42 may be attached to the free end of said arm. This connection 42 may be extended to any desired distance and point, and may, in turn, be attached to a suitable lever for the sake of convenience and ease of operation.

As reverse clutch pulleys of this particular type have heretofore been constructed, the gearing contained in my reverse gearing housing 15, has been, as previously stated, contained within the pulley 1, and this is filled with either an oil or a soft grease, to keep all the operating elements suitably lubricated. In my construction, the housing is filled with a suitable lubricant to keep the gearing and the adjacent bearings lubricated.

Now, for the purpose of keeping the shaft bearings of the pulley proper suitably lubricated, the interior of said pulley 1 is formed into an enclosed oil-chamber 1' into which a quantity of oil 43 is introduced. It is pointed out that said lubricant 43, within the pulley, is needed only when said pulley is revolving reversely to the direction of rotation of said shaft 2. In Fig. 3 is shown the device for and method of so applying the lubricant, which is as follows:

Within said pulley 1, and keyed or otherwise suitably secured to said shaft 2, is a radially-curved, laterally-dished wing or scoop 44, which is positioned with its convex face in opposition to the direction of rotation of the pulley; (during the reverse action) the outer point of said wing is in close juxtaposition to the inner face of the wall of the pulley. From the dish or opening in said wing, at the periphery of shaft 2, two lateral holes 45,—one on either side—are provided, and are disposed parallel with said shaft 2. As the pulley 1 revolves, centrifugal force causes the oil to lie in an even sheet or layer upon the inner circumference of said pulley, as shown in Fig. 3. As said wing revolves in the opposite direction, (as indicated by the arrows) the oil is directed with considerable velocity and momentum along the concave face of the dish of the wing, and passes laterally outward along shaft 2, and is projected against the shaft bearings of the pulley and thus effectually lubricates them. The action of this lubricating device is such as to cause a sufficient quantity of oil to enter the housing of the reverse gearing, to effectually supply lubricant to the parts contained therein, should not the soft grease be supplied, as previously stated.

It will be readily understood that a relative reverse rotation between pulley 1 and shaft 2 is not essential to cause the operation of this oiling device, since any relative difference in speed, when revolution is in the same direction, will cause the device to operate, as for instance, should the direct clutch for any reason permit a slippage in its drive of the pulley 1. Furthermore, this device may be effectually employed as a loose-pulley oiler. Said oiling device is more fully shown and described in a copend application filed by me on the 28th day of May, 1921, Serial No. 473504, for an oiler for loose pulleys.

My improved clutch pulley is intended especially to be employed as a driving pulley for gas and oil engines that are used for pumping oil wells. Such engines often operate for long periods of time without an attendant being present to give them attention, and because of this positive and efficient lubricating must be supplied to keep them suitably lubricated.

I am aware that a type of clutch pulley has long been in use having a reverse-gear of the bevel type, but up to this time the matter of enclosing such a type of gear in a suitable lubricant containing casing appears to have defied inventive effort, and for this reason such a gear has not satisfactorily met the requirements of the hard and peculiar service incident to the pumping of oil wells.

I am further aware that a type of spur gearing has been applied to reverse clutches in which the driving force or friction is secured by a series of frictional discs that are enclosed within the same chamber which contains said spur gearing. In such an organization it is not possible, or at least not practicable to place a lubricant, as it would seriously reduce the driving friction of said discs.

Claims.

1. A reversible clutch pulley comprising in combination, a power shaft, a pulley revolubly mounted upon said shaft and forming an enclosed chamber about said shaft for the reception of lubricating oil, clutch-engageable means rigidly carried by one end of said pulley, direct-clutch mechanism keyed to said shaft and adapted to be operatively engaged with said engageable means to drive said pulley in unison with said shaft, a hub carried by the opposite end of said pulley through which said power shaft passes, a coupling keyed to said shaft having a hub, the ends of said hubs being in juxtaposition to each other, a spur gear keyed to said pulley-hub, a spur gear keyed to said coupling hub, gear-housing revolubly carried by said hubs, a plurality of intermeshing pairs of pinions revolubly mounted in said housing, one end of one of each of said pairs of pinions being in mesh with said pulley-gear, and the opposite end of the other of each of said pairs of pinions being in mesh with said hub gear, said gear-housing being adapted to contain a lubricant for the gearing contained therein, a brake adapted to hold said gear-housing in a stationary position, and inter-connected means for simultaneously and reversely actuating said direct-clutch mechanism and said brake for the purpose set forth.

2. A reversible clutch pulley comprising, in combination, a power shaft, a pulley revolubly mounted upon said shaft and forming an enclosed lubricant receptacle about the same, a clutch-engageable means rigidly carried by one end said pulley, a clutch mechanism keyed to said shaft and adapted to be operatively engaged with said engageable means to drive said pulley in unison with said shaft, a hub carried by the opposite end of said pulley through which said power shaft passes, a coupling keyed to said shaft and having a hub, the ends of said hubs being in juxtaposition to each other, a spur gear keyed to said pulley-hub, a spur gear keyed to said coupling-hub, a gear housing revolubly carried by said hubs, a plurality of intermeshing pairs of pinions revolubly mounted in said housing, one end of one of each of said pairs of pinions being in mesh with said pulley and the opposite end of the other of each of said pairs of pinions being in mesh with said hub gear, said gear housing being adapted to contain a lubricant in which said gears are emersed, a brake adapted to hold said gear-housing in a stationary position to cause the drive of said pulley in a direction reversely to the direction of rotation of said power shaft, means within said lubricant receptacle of said pulley directing the lubricant therein into the bearings for said pulley upon said shaft when said reverse motion is caused, and interconnected co-ordinating means for simultaneously and reversely actuating said clutch mechanism and said brake, for the purposes set forth.

In testimony whereof I affix my signature.

HARRY C. STOLZ.